United States Patent Office 2,974,119
Patented Mar. 7, 1961

2,974,119

METHOD OF PLASTICIZING POLYACRYLONITRILE WITH A BASE-INITIATED COPOLYMER OF ACRYLONITRILE AND ACRYLAMIDE

Walter H. Schuller, Stamford, and David C. Guth, Norwalk, Conn., assignors to American Cyanamid Company, New York, N.Y., a corporation of Maine No Drawing. Filed Mar. 21, 1956, Ser. No. 572,833

1 Claim. (Cl. 260—45.5)

This invention relates broadly to base-initiated (base-catalyzed) copolymers, and more particularly is concerned with such copolymers that have been produced from a particular range of proportions of acrylonitrile and acrylamide under particular conditions of reaction. The base-initiated copolymers of this invention have an average molecular weight above 200, e.g., 300 to 6000 and higher. They have solubility characteristics which are different and distinct from "free radical"-initiated or -catalyzed homopolymeric acrylonitrile, homopolymeric acrylamide and copolymeric acrylonitrile-acrylamide. Thus, free radical-initiated homopolymeric acrylonitrile is substantially water-insoluble; free radical-initiated homopolymeric acrylamide, as usually prepared, is substantially water-soluble; and the free radical-initiated copolymers of acrylonitrile and acrylamide have, in general, water-solubility characteristics that are intermediate in scope between those of the similarly prepared homopolymeric acrylonitrile and homopolymeric acrylamide. In marked contrast, the base-initiated acrylonitrile-acrylamide copolymers of this invention are water-insoluble but are soluble in various organic solvents, e.g., acetone, acetonitrile, acrylonitrile monomer, and others. As a result of these unobvious and unique solubility characteristics and their other useful properties, the copolymers of this invention have fields of utility for which free radical-initiated (that is, the conventionally prepared) copolymers of acrylonitrile and acrylamide are entirely unsuited.

It was known prior to our invention that acrylonitrile could be added, with the aid of alkaline catalysts, to compounds containing one or more atoms of active hydrogen thereby to form cyanoethylated products (see, for example, Compt. rend., 27th Cong. intern. chim. ed. Brussels (1954), III, 363–6, and the bibliography therein; also U.S. Patents 2,608,554–5 to Bullitt, Jr., each dated August 26, 1952). However, to the best of our knowledge and belief it was not known prior to our invention that acrylonitrile-acrylamide copolymers having the particular properties of those of the present invention could be prepared; or that our disclosed and claimed method of preparation would yield such copolymers.

It is a primary object of the present invention to provide a new class of copolymers for use in industry.

It is a further object of the invention to provide a new class of water-insoluble but organic solvent-soluble copolymers from acrylonitrile and acrylamide monomers, thereby increasing the field of utility of the said monomers.

Another object of the invention is to provide a method of preparing the acrylonitrile-acrylamide copolymers of this invention.

Still other objects of the invention will be apparent to those skilled in the art from the following more detailed description and the illustrative examples.

The foregoing objects are accomplished by preparing a base-catalyzed (e.g., sodium methoxide-catalyzed) copolymer of acrylonitrile and acrylamide monomers in a weight ratio of from 80 to 98 parts of the former to from 20 to 2 parts of the latter, advantageously from 80 to 95 parts of the former to from 20 to 5 parts of the latter. The copolymers of the invention have an average molecular weight above 200 as determined by microisopiestic measurements.

In general, the copolymers described briefly above are prepared by reacting acrylonitrile and acrylamide, while admixed with a strong base as a catalyst for the reaction and at a temperature of from about $-30°$ C. to about $+75°$ C., more particularly at from $-10°$ C. to $+50°$ C., in the weight ratios mentioned in the preceding paragraph, and isolating the resulting copolymer from the reaction mass. Good results have been obtained by carrying out the reaction at from about $+10°$ C. to about $+45°$ C. One of the products of the reaction is N,N-bis-(2-cyanoethyl)acrylamide. This compound and also N-2-cyanoethylacrylamide, which can be prepared from the aforementioned bis-acrylamide, are disclosed and claimed (as well as homopolymers of said monomers and copolymers with other monomers) in our copending application Serial No. 572,830 (filed concurrently herewith), now abandoned.

Suitable catalysts (that is, strong bases) for use in carrying out the reaction are given in, for instance, the aforementioned Bullitt, Jr., patents and include alkali-metal alkoxides, aryls and amides, e.g., sodium and potassium methoxides, ethoxides and tert.-butoxides, sodium and potassium amides, phenyllithium, indenyllithium, lithium ethylphenylamide, lithium diphenylamide; and the salts, with alkali-forming metals (group IA and IIA metals), of alkanes, aralkanes, nitriles, amines, etc., e.g., dianiline calcium, ethylsodium, etc. Such catalysts have been described as being salts, with an alkali-forming metal, of an acid having a $pK_a$ of from 15 to 75. Other suitable catalysts include the strongly basic quaternary ammonium hydroxides, e.g., tetramethyl ammonium hydroxide, tetraethanol ammonium hydroxide, benzyl trimethyl ammonium hydroxide, benzyl triethyl ammonium hydroxide, and others.

The base is employed only in catalytic amounts; that is to say, in amounts within the range of from about 0.01% to 5%, and preferably from 0.1% to 2%, by weight of the total weight of acrylonitrile and acrylamide.

The time of the reaction, when carried out by so-called "batch" technique, will generally vary from 1 or 2 minutes to 3 hours, or longer in some cases, depending upon the particular proportions of reactants used, the particular catalyst and reaction temperature employed, the degree of reaction desired (that is, the properties wanted in the end product), and other influencing factors. In general, however, the reaction proceeds (in a batch operation) to yield the desired copolymer within a period of from 3 minutes to 2 hours at temperatures of from $+10°$ C. to $+75°$ C., and within a longer period at temperatures below $+10°$ C. The reaction also can be carried out semi-continuously or continuously, as described more fully in the examples given hereinafter.

The reaction mass is preferably neutralized at the end of the reaction period, e.g., by the addition of an acidic substance such as ammonium chloride, acetic acid or the like. The copolymeric reaction product is then isolated from the reaction mass. This usually involves the removal of the unreacted monomers (if any), and reaction products [e.g., N,N-bis(2-cyanoethyl)acrylamide] other than the desired acrylonitrile-acrylamide copolymers having an average molecular weight above 200, followed by isolation of the desired reaction product.

An important feature of our invention resides in the fact that acrylonitrile monomer is a solvent for acrylamide monomer, and hence the method of our invention requires the use of no mutual solvent for the monomers in which to carry out the reaction. The practical advantages of this will be immediately apparent to those skilled in the art.

In order that those skilled in the art may better understand how the present invention can be carried into effect, the following examples are given by way of illustration and not by way of limitation. All parts and percentages are by weight.

*Example 1*

Using conventional equipment, 140 ml. of a 16.7:83.3 weight ratio of acrylamide dissolved in acrylonitrile is added to a reaction vessel, and 2.6 ml. of 4.07 N solution of sodium methoxide (catalyst) in methanol is added simultaneously, during vigorous stirring, over a 6½ hour period. The temperature is maintained at 30° C. during the entire time by means of external cooling. At the end of this period 2 ml. of glacial acetic acid is added, and the reaction mass is dissolved in dimethylformamide. The product is fractionated by the addition of an excess of water. The yellow solid (base-initiated copolymer of acrylamide and acrylonitrile) that precipitates is filtered off and dried. It has a molecular weight of 900 (isopiestic) and a melting point of 132°–135° C. Based on infrared analysis and the chemistry of the system, the structure of this polymer is postulated as being a random copolymer containing the recurring units

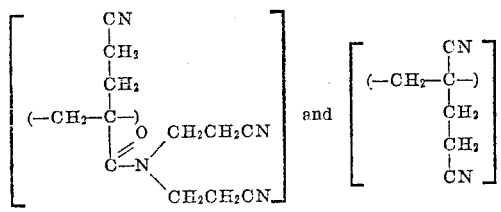

in a ratio of 1 of the former to 2 of the latter.

This copolymer is soluble in acetone, acetonitrile and acrylonitrile monomer. It is insoluble in water.

*Example 2*

This example illustrates a continuous method of preparing a base-initiated copolymer of acrylamide and acrylonitrile using a slightly different weight ratio of monomers.

The reactor comprises a 700 ml. glass vessel 4½ inches in diameter, 7 inches high, having a dome cover and provided 4 inches from the bottom with an outlet spout having an inside diameter of ¾ inch. The dome cover is equipped with a stirrer, thermometer, monomer and catalyst feed lines, and a reflux condenser. The reactor is immersed in a large, constant-temperature bath filled with glycerine. The monomer solution is metered into the reactor by a gear pump. The catalyst-feeding device is a glass, piston-displacement feeder operated by a clock motor.

The monomer solution consists of a 15:85 weight ratio of acrylamide dissolved in acrylonitrile. The catalyst solution consists of a 0.5 N solution of sodium methoxide (sodium methylate) in methanol. The acrylonitrile contains 0.57% by weight of water which is present as a stabilizer. The run is started by introducing the monomer solution at 2180 ml./hour and the catalyst solution at 73 ml./hour into the empty reactor, with the bath temperature at 45° C. The temperature of the reaction is maintained at 45° C. throughout the run. One hundred and seventy (170) minutes after the start of the run equilibrium conditions are considered to have been obtained and the equilibrium product (hereafter for brevity designated as "EP") is then collected for a total of 70 minutes. The EP is collected in 32-ounce bottles, each of which contains 100 ml. of 0.33 N acetic acid. The acid mixture is stirred during the collection of product. The pH of the acid-EP mixture is 4–4.5 throughout.

The EP from all of the 32-ounce bottles is combined, the organic layer separated from the aqueous acid layer, and the organic layer washed twice with 500 ml. portions of 0.1 N hydrochloric acid, and then washed with four 400 ml. portions of water. The washed acrylonitrile solution of the desired product, a copolymer of acrylamide and acrylonitrile, is dried with sodium sulfate. The drying agent is filtered off and the filtrate concentrated under reduced pressure. The work-up of the aliquot involves dissolution in acetone and precipitation, by the addition of methanol, of a yellow, solid, base-initiated copolymer of acrylonitrile and acrylamide (established by getting an infrared nitrile-amide molar ratio). Specifically, this is done in the following manner: 10 parts of acetone and 20 parts of stripped equilibrium product are used to make a solution which is then precipitated in 130 parts of methanol, allowed to stand for 1 hour, then centrifuged and the liquor decanted. Forty parts of methanol is then added to the solid; the solid is dispersed, the dispersion centrifuged and the liquor decanted. The solid copolymer is air-dried and then pumped in a vacuum desiccator for 3 hours over calcium chloride. The yield of dried copolymer amounts to about 2.98 parts.

The copolymer produced as described above softens at 122° C. and melts at 128° C. on a Fisher-Johns melting-point block. It has an average molecular weight above 500. Analysis of the copolymer by infrared technique indicates that it contains recurring units of the kind described under Example 1 in a ratio of about 1 to 1. It is insoluble in water but soluble in the same organic solvents as the product of Example 1.

*Example 3*

Example 1 is repeated using a 2:98 (instead of 16.7:83.3) weight ratio of acrylamide dissolved in acrylonitrile. The isolated and purified copolymer has an average molecular weight substantially above 200. It is insoluble in water but soluble in acetone.

*Example 4*

Seventy (70) parts of homopolymeric acrylonitrile ("free radical" initiated) having an average molecular weight (Staudinger method) of about 60,000 and 30 parts of the base-initiated acrylamide-acrylonitrile copolymer of Example 1 are ball-milled together for 24 hours to form a homogeneous molding composition.

A sample of the ball-milled product is molded, in the form of a disc, in a compression mold for 10 minutes at 300° F. under a pressure of about 1500 pounds per square inch. A hard, well-molded piece having a good surface appearance and which shows good plastic flow during molding is obtained. In marked contrast when a sample of the unmodified homopolymeric acrylonitrile is similarly molded, it shows poor plastic flow during molding and does not flow readily to all edges of the mold as evidenced by the appearance of the molded article.

It is to be understood that our invention is not limited to the specific ingredients named in the above illustrative examples nor to the particular proportions and methods named therein. Variations in catalyst and amount thereof, in proportions of acrylonitrile and acrylamide, in time, temperature and other conditions of reaction, etc., can obviously be made, as has been indicated in the portion of this specification prior to the examples.

Other uses of the copolymers of this invention, in addition to the specific use illustrated by Example 4, include their use as plasticizers of polyacrylonitriles (both homopolymers and copolymers) to impart better flow characteristics thereto during molding or otherwise forming shaped articles therefrom; and in plasticizing or otherwise modifying, to improve the useful properties thereof, a wide variety of other addition and condensation polymers, natural resins and gums, etc., including homopolymeric acrylamide, urea-formaldehyde resins, phenolformaldehyde resins, melamine-formaldehyde resins, epon resins, alkyd resins, polyester resins, rosin, shellac, and others.

We claim:

A method of plasticizing free-radical initiated homopolymeric acrylonitrile by mixing the said homopolymeric acrylonitrile with a base-initiated copolymer of acrylonitrile and acrylamide which was prepared by reacting 80 to 98 parts of acrylonitrile with 20 to 2 parts of acrylamide in the presence of a catalyst selected from the class consisting of (1) alkali-forming metal salts of an acid having a $pK_a$ of from 15 to 75 and (2) a quaternary ammonium hydroxide selected from the class consisting of tetramethyl ammonium hydroxide, tetraethanol ammonium hydroxide, benzyl trimethyl ammonium hydroxide and benzyl triethyl ammonium hydroxide, at a temperature ranging from —30° C. to about 75° C.

References Cited in the file of this patent

UNITED STATES PATENTS

| | | |
|---|---|---|
| 2,424,664 | McQueen | July 29, 1947 |
| 2,436,926 | Jacobson | Mar. 2, 1948 |
| 2,486,241 | Arnold | Oct. 25, 1949 |
| 2,608,554 | Bullitt | Aug. 26, 1952 |
| 2,688,010 | Chaney | Aug. 31, 1954 |
| 2,776,271 | Coover et al. | Jan. 1, 1957 |
| 2,790,789 | Miller | Apr. 30, 1957 |

FOREIGN PATENTS

| | | |
|---|---|---|
| 675,143 | Great Britain | July 2, 1952 |